(12) United States Patent
Brand et al.

(10) Patent No.: US 7,017,607 B2
(45) Date of Patent: Mar. 28, 2006

(54) EXPANSION CONTAINER FOR A FUEL TANK

(75) Inventors: Volker Brand, Stuttgart (DE); Karl-Heinz Kempa, Rutesheim (DE); Ralf Lângerer, Stuttgart (DE); Thomas Rieger, Wolfschlugen (DE); Dieter Scheuerenbrand, Wolfschlugen (DE); Peter Strätz, Freiberg (DE)

(73) Assignee: Daimler Chrysler AG, Stuttgart (DE)

( * ) Notice: Subject to any disclaimer, the term of this patent is extended or adjusted under 35 U.S.C. 154(b) by 0 days.

(21) Appl. No.: 10/837,496

(22) Filed: Apr. 30, 2004

(65) Prior Publication Data

US 2004/0238032 A1     Dec. 2, 2004

(30) Foreign Application Priority Data

May 2, 2003   (DE) ................................ 103 19 595

(51) Int. Cl.
*F16K 24/00*     (2006.01)
(52) U.S. Cl. .......................................... 137/587; 137/43
(58) Field of Classification Search ................ 137/43, 137/587
See application file for complete search history.

(56) References Cited

U.S. PATENT DOCUMENTS

| 3,771,690 | A | * | 11/1973 | Hunter ......................... 137/43 |
| 5,996,622 | A | * | 12/1999 | Cimminelli et al. ........ 137/587 |
| 6,318,398 | B1 |   | 11/2001 | Ehrman et al. |

FOREIGN PATENT DOCUMENTS

| DE | 197 05 440 | 9/1997 |
| DE | 199 57 769 | 7/2001 |
| DE | 101 12 133 | 3/2002 |
| EP | 0 900 684  | 3/1999 |
| EP | 1 314 604  | 5/2003 |

* cited by examiner

*Primary Examiner*—Kevin Lee
(74) *Attorney, Agent, or Firm*—Klaus J. Bach

(57) ABSTRACT

In an expansion container for a fuel system of a motor vehicle wherein the expansion container includes a container wall and a gas vent connector mounted on the container wall so as to be in communication with the interior of the expansion container by way of a valve, the expansion container and the gas vent connector consist of metal and are joined by at least a first seal structure and the gas vent connector is connected to the valve by at least a second seal structure.

12 Claims, 4 Drawing Sheets

EXPANSION CONTAINER FOR A FUEL TANK

BACKGROUND OF THE INVENTION

The invention resides in an expansion container for a fuel system of a motor vehicle including a container wall and a gas vent connector which is in communication within the expansion container by way of a valve.

An expansion container for a fuel system is already known from U.S. Pat. No. 6,318,398. The expansion container in this case consists of two parts made from a thermoplastic material. One part is at least partially in the form of a roll-over valve and is welded together with the other part in a water-tight manner. The contact area includes surface structures which extend into one another and which are joined in a form-locking manner by welding.

It is the object of the present invention to provide an expansion container for a fuel system and arrange it in connection with a fuel tank in such a way that the emissions of the motor vehicle are reduced.

SUMMARY OF THE INVENTION

In an expansion container for a fuel system of a motor vehicle wherein the expansion container includes a container wall and a gas vent connector mounted on the container wall so as to be in communication with the interior of the expansion container by way of a valve, the expansion container and the gas vent connector consist of metal and are joined by at least a first seal structure in a gas and liquid tight manner, a support structure is sealingly connected to the expansion container around the gas vent connector and the valve is connected to the support structure by at least a second seal structure.

In this way, the seals between the gas vent connector and the support structure or, respectively, between the support structure and the valve need to be only liquid seals. The expansion container and the gas vent connector are 100% diffusion tight so that, only the desired gas or vapor flow through the gas vent connector can occur but no fuel can leave the expansion container. In this way, the future HC emission limit values for passenger cars can be accommodated.

It is advantageous in this connection if the first seal structure is formed by welding, soldering, cementing or by a form-locking seal structure.

If the first seal structure is formed by welding, the seal provides full protection against the release of fuel vapors. The strength of such a seal or, respectively, connection furthermore ensures that the gas vent connector remains sealed and the gas vent connector or, respectively, the mounting of the expansion container by way of the gas vent connector can accommodate mechanical stresses.

In a particular embodiment of the invention, the valve is in the form of a roll-over valve and consists of plastic or metal or a combination thereof and is arranged in the expansion container.

The arrangement of the rollover valve within the expansion container ensures that the seal structure prevents the escape of liquid fuel during a roll-over accident. Fuel vapors are conducted away by way of the gas vent connector.

It is furthermore advantageous if the valve includes a housing which is connected to the gas or vapor vent connector or a support structure associated with the gas or vapor vent connector by a releasable mounting means.

The valve housing can therefore simply be inserted into the support structure or, respectively, the gas vent connector, such that it is firmly connected thereto. An unintentional release is impossible.

It is also advantageous if a third seal structure is disposed between the support structure and/or the container wall.

The third seal structure is adapted to prevent the release of liquid fuel into the gas or vapor vent connector if the support structure is not welded or soldered to the container wall. The seal structure is preferably elastic so that manufacturing tolerances or assembly tolerances do not affect the tightness of the seal.

In a preferred embodiment of the expansion container according to the invention, the second and/or third seal structure comprises a plastic seal member such as an O-ring which is capable of blocking liquids.

A seal in the form of the O-ring facilitates the mounting and provides for an optimal fit of the seal.

In connection with the present invention, it is particularly important that the plastic seal represents a part of the support structure and retains the container by a form-fit or by frictional engagement.

Depending on the engagement groove receiving the O-ring seal, the O-ring seal may provide additionally for a retaining effect. This effect could be achieved by the O-ring providing for a clamping effect between the seal flange of the valve housing and the seal flange of the support structure so that no other engagement means would be necessary.

In connection with the arrangement according to the invention, it is advantageous if the support structure, the valve housing and the gas vent connector are coaxially aligned and at least the second and/or the third seal structure is an O-ring, which is arranged co-axially with the support structure. The co-axial arrangement of the seal structure or respectively, the seal surfaces facilitates the manufacture and also the mounting of the valve.

It is furthermore advantageous if the support structure and the valve housing are joined so as to form a single part, in the form of an assembly unit. The support structure can then be connected to the container wall together with the valve housing.

It is furthermore advantageous if the support structure consists of metal and is connected to the valve housing by welding, soldering, or cementing.

If the support structure consists of metal and is connected to the container wall by welding or soldering, the valve housing which is firmly engaged with the support the support structure is also securely mounted.

Further details and advantages of the invention will become apparent from the following description thereof on the basis of the accompanying drawings.

DESCRIPTION OF PREFERRED EMBODIMENTS

Figure 1:
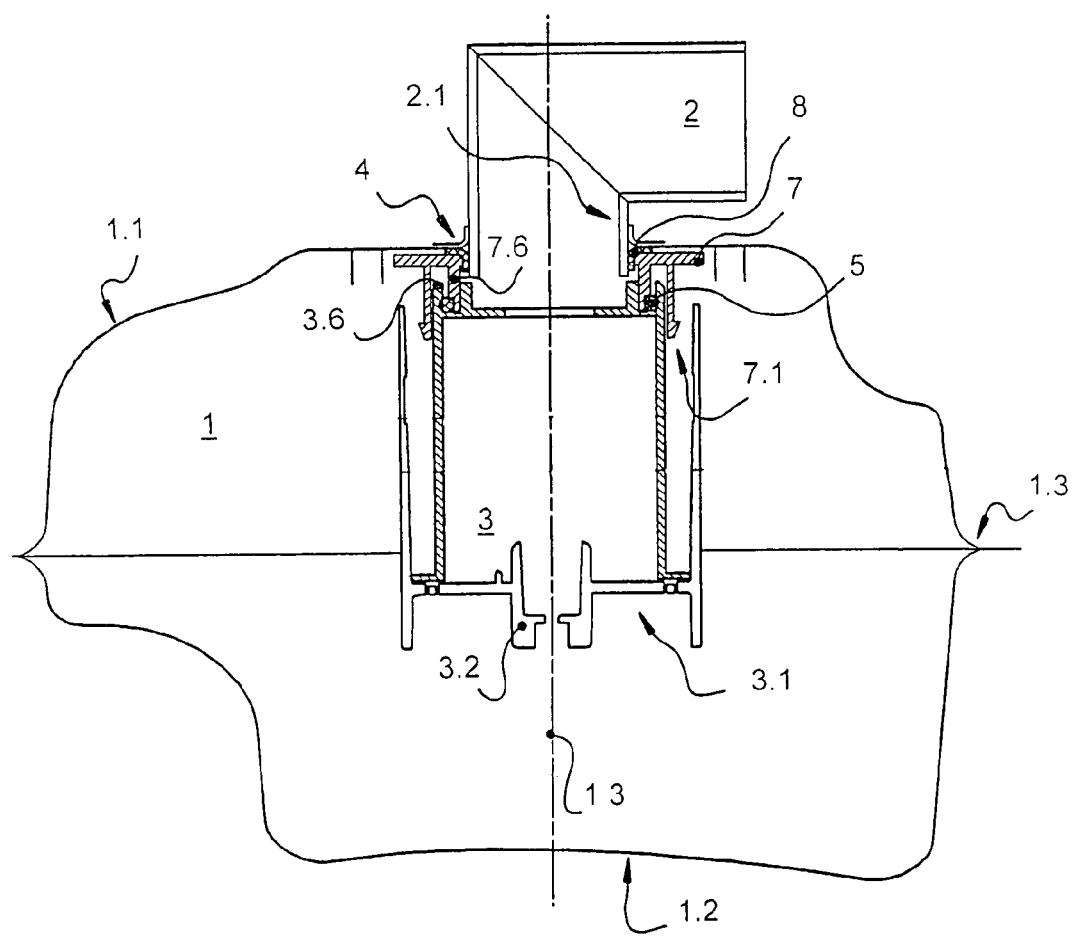
FIGS. 1–3 show a venting container with a vent connector a support structure and a valve housing with different mounting structures.

FIG. 1 shows an expansion container 1 which includes a two-part container wall 1.1, 1.2, wherein the top part 1.1 is provided with a gas or vapor vent connector 2.

The gas vent connector is in the form of an elbow including a first end 2.1, which is received in an opening of the container wall top part 1.1. Between the gas vent connector 2 and the container wall 1.1, a first seal structure 4 is provided which is in the form of a weld connection. The gas vent connector 2 is connected to the container wall 1.1 in this way in a form locking and gas and liquid-tight manner. Within the expansion container 1, the first end 2.1 of the gas vent connector 2 is provided with a support structure 7. The support structure 7 surrounds the open first end 2.1 of the connector 2 and is connected to the container wall top part 1.1 by way of retaining means which are not shown in the drawings. The retaining means are bolts, pins or weld connections for example. Between the support structure 7 and the gas vent connector 2 and between the support structure 7 and the container top wall 1.1, a third seal structure 8 is provided. The third seal structure consists of a plastic material and is disposed annularly around the outer circumference of the first end 2.1 of the gas vent connector 2. The seal structure 8 is pressed by the support structure 7 against the first end 2.1 of the gas vent connector 2 and also against the container wall top part 1.1.

The support structure 7 includes a circumferential seal flange 7.6 and a circumferential holding projection 7.1, which are both coaxial with respect to a common center axis 13. The seal flange 7.6 is provided with a second seal structure 5, which is arranged between the seal flange 7.6 and the valve housing 3.1. The second seal structure 5 is in the form of an O-ring and is received with one side thereof by a groove formed in the outer circumference of the seal flange 7.6. With the other side thereof, the second seal structure 5 tightly engages a valve housing 3.1 or, respectively the inner wall of a seal flange 3.6 of the valve housing 3.1.

The holding projection 7.1 extends co-axially with the seal flange 7.6 and engages locking means on the valve 3 or, respectively, the valve housing 3.1, which are not shown.

The valve housing 3.1 has a basic cylindrical shape and has a front end on which the seal flange 3.6 is disposed. The opposite end forms a structure 3.2 for accommodating a float member of a valve which is not shown.

The top part 1.1 of the container wall and the lower part of the container wall 1.2 are joined along a connecting flange 1.3 extending in a plane normal to the center axis 13 of the valve 3.

Figure 2:
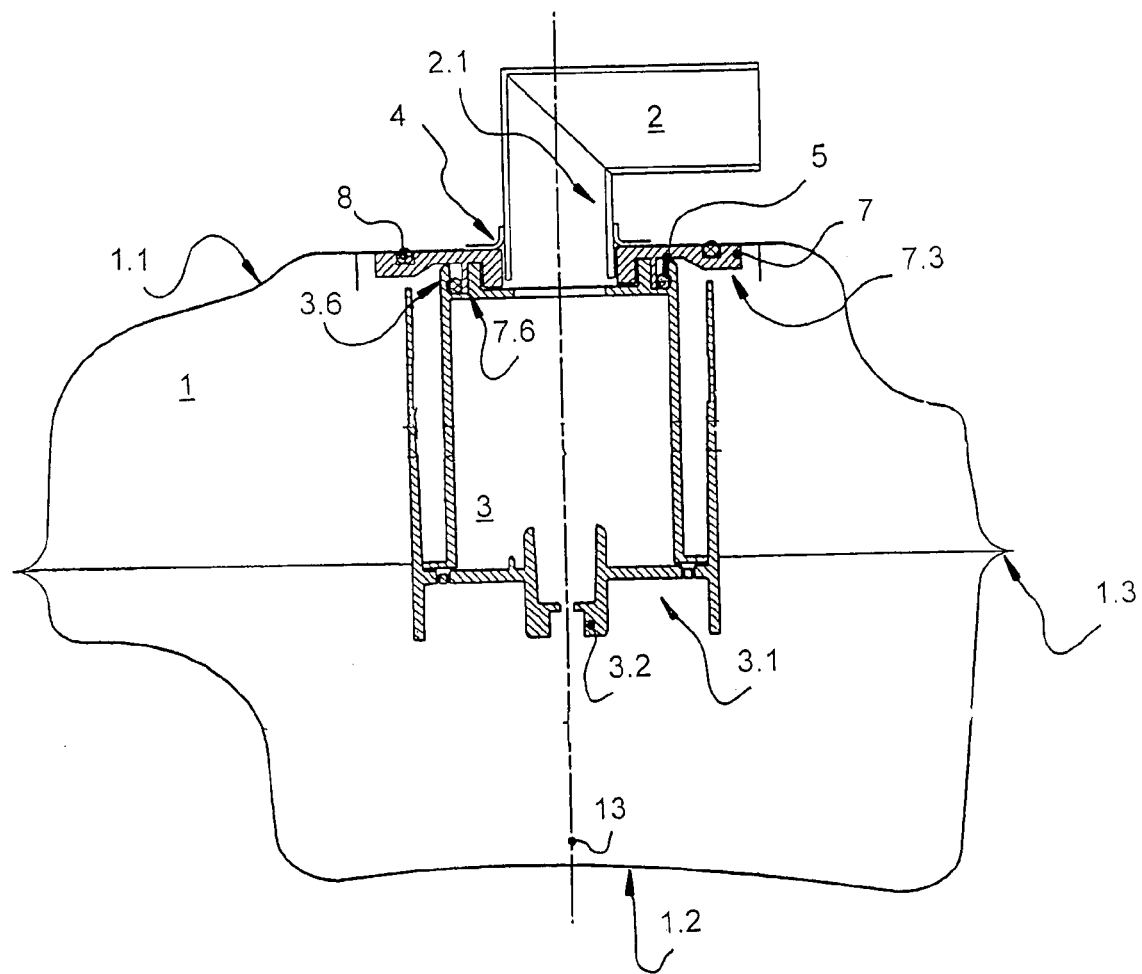

In the embodiment as shown in FIG. 2, a third seal structure 8 is arranged between the support structure 7 and the container top wall 1.1. The seal structure 8 is disposed in an annular recess of the support structure 7, which is co-axial with the center axis 13 and abuts the inside of the container top wall 1.1. The support structure 7 extends radially with respect to the center axis 13 and, consequently, forms a second flange 7.3, which axially abuts the container top wall 1.1.

The second seal structure 5 between the valve housing 3.1 and the support structure 7 is arranged radially between the seal flange 3.6 and the first seal flange 7.6 like in the embodiment of FIG. 1. The gas vent connector 2 is welded at its first end 2.1 to the container top wall 1.1 in the area of the opening thereof.

Figure 3:
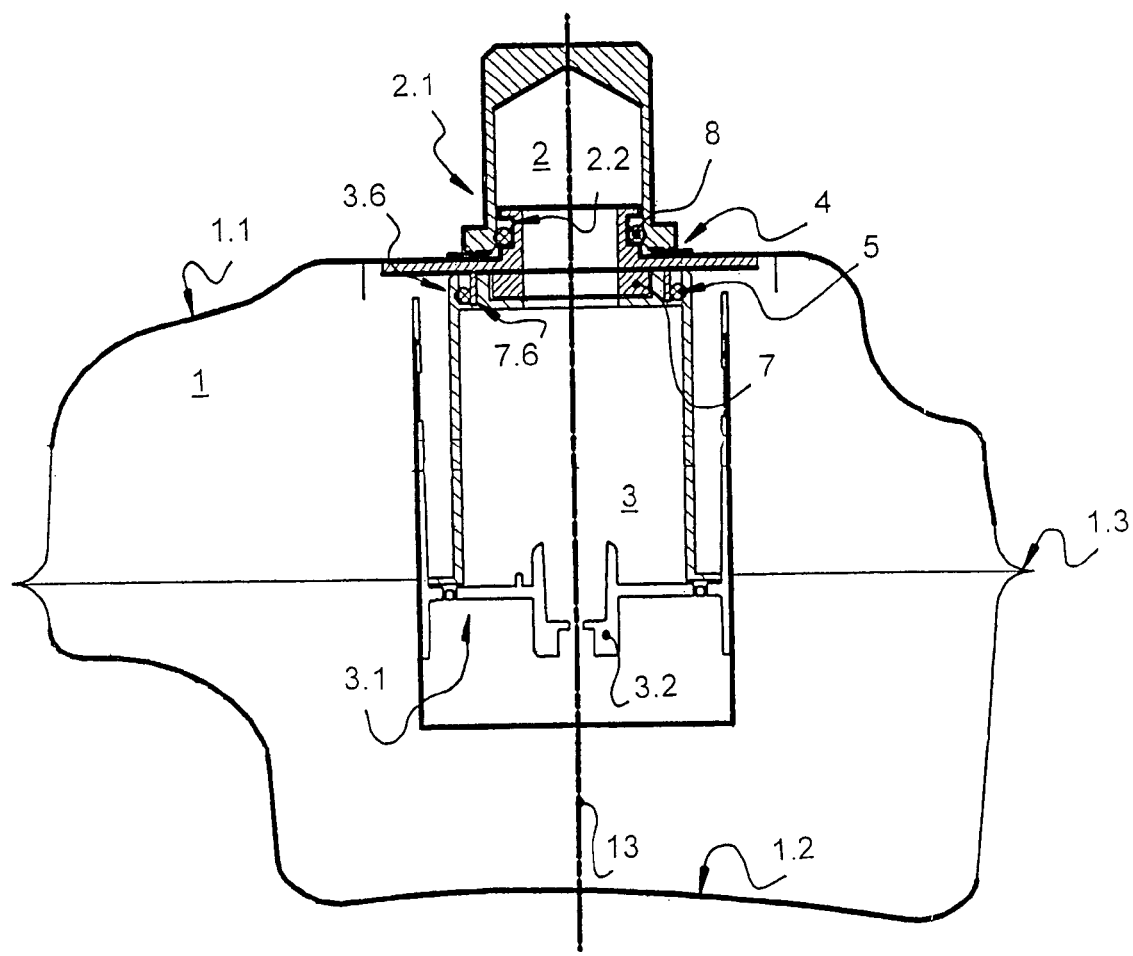

In accordance with the embodiment as shown in FIG. 3, the third seal structure 8 comprises an O-ring which is disposed between the support structure 7 and the gas vent connector 2. The support structure 7 extends into the first end 2.1 of the gas vent connector 2 and is provided at its circumference with an annular recess 2.2 which is co-axial with the center axis 13. The seal structure 8 is disposed with one side thereof in the recess 2.2 and engages with its radially opposite side the inside wall of the gas vent connector 2 in sealing relationship therewith.

The support structure 7 is connected to the inside wall of the container top wall 1.1 by spot welding and receives the valve housing 3.1, which is locked thereto by a snap-in locking structure which is not shown.

The second seal structure 5 is essentially the same as shown in the first and second embodiments, (FIGS. 1 and 2), that is, it is arranged between the seal flange 3.6 of the valve housing 3.1 and the seal flange 7.6 of the support structure 7.

The support structure 7 may consist of metal and may be connected to the valve housing by welding by soldering or by cementing.

In this connection, the part of the support structure 7 which is disposed in the expansion container 1 is radially larger than the opening in the container top wall 1.1 and abuts the container top wall 1.1 from the inside thereof for connection thereto for example by welding.

Figure 4:
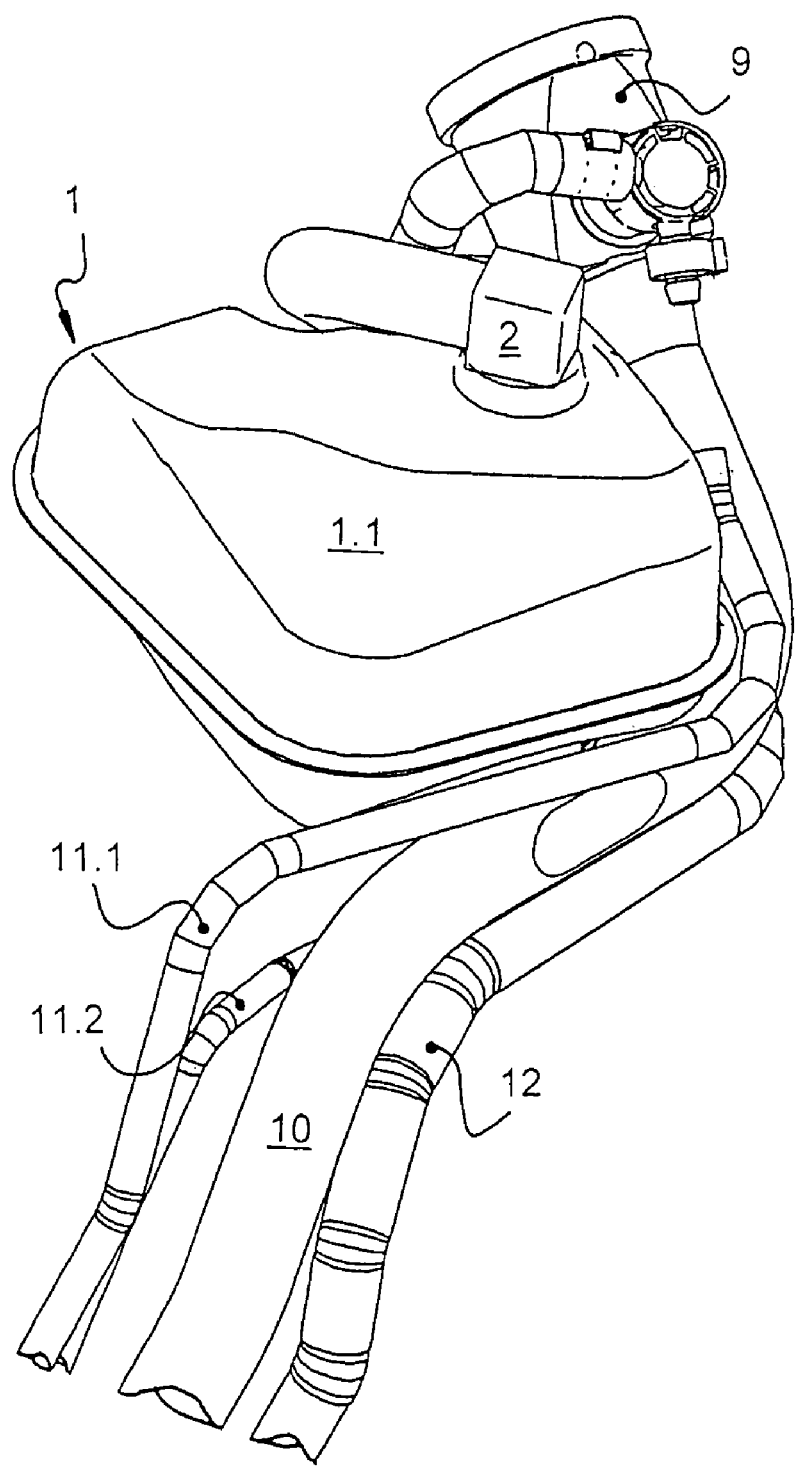
FIG. 4 is a perspective view of such a venting container including a valve housing.

As shown in FIG. 4, the expansion container 1 is provided with a filler neck 9 and a fuel pipe 10 for a fuel tank which is not shown. In addition to the fuel pipe 10 a first operating vent line 11.1 is provided as well as a second operating vent line 11.2 and a vent line 12 for refueling.

What is claimed is:

1. An expansion container (1) for a fuel system of a motor vehicle, said expansion container (1) comprising a container wall (1.1) with an opening, a gas vent connector (2) mounted on said container wall (1.1) so as to be in communication with the interior of the expansion container (1) via said opening, a support structure (7) sealingly mounted to said container wall so as to extend around said opening, a valve (3) located within said expansion container (1) and connected to said support structure in sealed engagement therewith, said gas vent connector (2) consisting of metal and being joined by at least a first seal structure (4) in a gas and liquid tight manner and said gas vent connector (2) being connected to said valve (3) by at least a second seal structure (5).

2. An expansion container according to claim 1, wherein said first seal structure (4) comprises one of a welded, a soldered, a cemented and a form-fitted joint.

3. An expansion container according to claim 1, wherein said valve (3) is a rollover valve which consists of plastic and is arranged in said expansion container (1).

4. An expansion container according to claim 1, wherein said valve (3) is a rollover valve which consists at least partially of metal and is arranged in said expansion container (1).

5. An expansion container according to claim 1, wherein said valve (2.2) comprises a valve housing (3.1) which is connected to said gas vent connector (2) or a support structure (7) thereof by at least one releasable holding means (7.1).

6. An expansion container according to claim 5, wherein a third seal structure (8) is disposed between said support structure (7) and said gas vent connector (2) and the container top wall (1.1).

7. An expansion container according to claim 6, wherein at least one of said second and said third seal structures (5, 8) includes a plastic seal suitable as a sea for liquids.

8. An expansion container according to claim 7, wherein said plastic seal is an O-ring.

9. An expansion container according to claim 7, wherein said plastic seal (5, 8) is a part of an engagement structure including said holding means (7.1).

10. An expansion container according to claim 5, wherein said support structure (7), said valve housing (3.1) and said gas vent connector (2) are arranged co-axially and at least one of said seal structures (5, 8) is an O-ring arranged coaxially with said support structure (7).

11. An expansion container according to claim 5, wherein said support structure (7) and said valve housing (3.1) are joined so as to form a single assembly unit.

12. An expansion container according to claim 1, wherein said support (7) consists of metal and is firmly connected to said valve housing (3.1) by one of welding, soldering and cementing.

\* \* \* \* \*